(12) United States Patent
Hameleers et al.

(10) Patent No.: US 6,928,067 B1
(45) Date of Patent: Aug. 9, 2005

(54) BASIC ARCHITECTURE FOR PACKET SWITCHED PROTOCOL BASED GSM NETWORKS

(75) Inventors: Heino Hameleers, Kerkrade (NL); Frank Hundscheidt, Kerkrade (NL); Eric Valentine, Plano, TX (US); Lee Davidson, McKinney, TX (US)

(73) Assignee: Telefonaktiebolaget LM Ericsson (pub), Stockholm (SE)

( * ) Notice: Subject to any disclaimer, the term of this patent is extended or adjusted under 35 U.S.C. 154(b) by 0 days.

(21) Appl. No.: 09/515,766

(22) Filed: Mar. 1, 2000

(30) Foreign Application Priority Data

Mar. 2, 1999 (EP) .................................. 99104173

(51) Int. Cl.[7] ........................ H04L 12/66; H04L 12/28; H04J 3/16; H04Q 7/20
(52) U.S. Cl. ...................... 370/352; 370/401; 370/469; 370/410; 455/433; 455/445
(58) Field of Search ................................ 370/310, 328, 370/338, 342–347, 351, 389, 400, 401, 464–467, 370/469, 352, 356, 410, 426, 329; 455/403, 455/422, 426–429, 432, 433, 445; 709/249

(56) References Cited

U.S. PATENT DOCUMENTS

| 5,475,689 A |   | 12/1995 | Kay et al. ................... 370/95.3 |
| 5,940,759 A | * | 8/1999 | Lopez-Torres et al. ..... 455/433 |
| 5,940,763 A | * | 8/1999 | Alperovich et al. ......... 370/337 |
| 6,185,288 B1 | * | 2/2001 | Wong .......................... 370/352 |
| 6,434,133 B1 | * | 8/2002 | Hamalainen ................ 370/338 |
| 6,434,140 B1 | * | 8/2002 | Barany et al. .............. 370/352 |

FOREIGN PATENT DOCUMENTS

EP 0910198 A2 4/1999

OTHER PUBLICATIONS

Lopez-Pérez, M-C, PCT International Search Report, International App. No. PCT/EP00/00711, Jun. 23, 2000, pp. 1-3.

* cited by examiner

Primary Examiner—Hanh Nguyen

(57) ABSTRACT

Communication network and a corresponding method are disclosed for operating the communication network that has a packet switched protocol based cellular telephone network comprising a first layer for transferring signalling information assigned to a telephone call being processed by the communication network, a second layer for transferring payload information assigned to the telephone call and an interface for coupling the cellular telephone network to a further network, the interface comprising a signalling information exchange function between the cellular telephone network and the further network and a payload information exchange function between the cellular telephone network and the further network, the first layer and the second layer of the cellular telephone network being coupled to the interface, wherein the second layer of the cellular telephone network transfers the payload information of the telephone call to and from the interface on a direct route assigned to the telephone call within the second layer.

28 Claims, 2 Drawing Sheets

BASIC ARCHITECTURE FOR PACKET SWITCHED PROTOCOL BASED GSM NETWORKS

TECHNICAL FIELD OF THE INVENTION

The present invention relates to a communication network having a cellular telephone network, for instance, the GSM network (Global System for Mobile communication), and a further network, for instance, an internet protocol network or a general switched telephone network (GSTN), which is coupled to the cellular telephone network by means of an interface that comprises a signalling information exchange function and a call or payload information exchange function between the cellular telephone network and the further network.

HISTORY OF THE RELATED ART

Recently, there have been made attempts in a more and more increasing manner to couple and to integrate a mobile cellular telephone network, for instance, the GSM network that is generally a circuit switched network to a further kind of networks, called packet switched networks, for instance, an internet protocol network or VoIP (Voice on Internet Protocol) network, wherein call information is transferred in the form of "packets" between the called member and the calling member and vice versa. The packet switched network uses several different ways or through-connections to transfer the packets between the users, whereas in the circuit switched world, for instance, the GSM network, a through-connection is established within the network and, as long as the through-connection is maintained, the whole call information including signalling and payload information is transferred via the through-connection in the circuit switched network between the users.

A through-connection in a communication network that comprises, for instance, a GSM network or a similar cellular telephone network and an internet protocol network or packet switched network being coupled with each other by interface means is established in the conventional cellular telephone network via a base transceiver station, a base station controller and a mobile services switching centre to the interface that in turn is coupled to the internet protocol network or packet switched network. Each node in a packet switched network which processes the payload information causes some delay in the payload transport. This renders the known architecture of the GSM telephone network improper or not very well suited for coupling to a packet switched network, for instance, an internet protocol network or similar network.

SUMMARY OF THE INVENTION

Thus it is an object of the present invention to create a communication network that has a new cellular telephone network architecture and a method for information flow in this communication network which minimise the delay problems and bandwidth requirements.

Accordingly, the communication network of the invention has a packet switched protocol based cellular telephone network comprising a first layer for transferring signalling information assigned to a telephone call being processed by the communication network, a second layer for transferring payload information assigned to the telephone call and interface means for coupling the cellular telephone network to a further network, the interface means comprising signalling information exchange function between the cellular telephone network and the further network and payload information exchange function between the cellular telephone network and the further network, the first layer and the second layer of the cellular telephone network being coupled to the interface means, wherein the second layer of the cellular telephone network transfers the payload information of the telephone call to and from the interface means on a direct route, way or through-connection assigned to the telephone call within the second layer.

Since in the invention the payload of a call is routed directly within the second layer of the cellular telephone network to or from the interface means the payload information is not transferred via the longer and more time consuming way of the conventional systems, i.e., for instance, the mobile services switching center of a conventional GSM network, and, therefore, a corresponding delay in the cellular telephone network and the delay and bandwidth problems involved therewith are minimised or they are avoided in the communication network of the invention.

In a preferred embodiment of the invention the second layer of the cellular telephone network comprises a number of base transceiver stations, each base transceiver station handling the radio link protocol functions to mobile stations within a cell area assigned to the respective base transceiver station and wherein the base transceiver station being directly connected to the interface means for payload information exchange within the second layer. By routing the payload information directly from the base station transceiver to the interface means, for instance, the media gateway, the bandwidth requirements for transferring the payload information are minimised.

The interface means can comprise a media gateway for payload information exchange between the cellular telephone network and the further network and to be coupled directly to the base transceiver stations. Accordingly, in the invention, a part of the functions of the mobile services switching center of the state of the art, more specifically the payload information transfer function, is established in the interface means of the invention, i.e. the media gateway, whereas the other functions, particularly the call signalling function and call control function, are maintained and carried out in the first layer, for instance, in the mobile services switching center. In this regard the present invention provides a so-called "distributed mobile services switching center", since the transfer of payload information, as mentioned above, is moved from the conventional mobile services switching center to the media gateway of the interface means of the invention.

The interface means can comprise media gateway means for payload information exchange between the cellular telephone network and the further network and the mobile services switching center can be connected to the media gateway means to control the media gateway means. By selecting the mobile service switching center as media gateway controller, a large part of the conventional GSM functionality can be reused in the communication network of the invention and the media gateway functionality can be kept simple in the communication network of the invention.

In the invention, the first layer of the cellular telephone network can comprise at least one mobile services switching center that is coupled to the interface means for signaling information exchange or communication. The interface means used in the invention can comprise signalling gateway means for signalling information exchange between the cellular telephone network and the further network and the mobile services switching center is connected to the signalling gateway means to exchange signalling information between the signalling gateway means and the mobile services switching center. This allows to use the conventional trunk signaling protocols, for instance, ISUP (ISDN User Part) that can be carried, for instance, over the TCP/IP (Transmission Control Protocol/Internet Protocol) within the cellular telephone network.

In a preferred embodiment of the invention, the first layer of the cellular telephone network comprises at least one base station controller coupled to a number of base transceiver stations and being connected to the mobile services switching center of the first layer, wherein the base station controller controls each of the base transceiver stations of the second layer by means of a device control protocol function and communicates to the mobile services switching center by means of an application signalling protocol function.

As further network part a packet switched network or a circuit switched network can be implemented. For instance, the further network part can be the Internet, a VoIP network, a Internet protocol network, an ISDN network, a PLMN network, a PSTN (Public Switched Telephone Network) network, a GPRS network or a UMTS network.

The method of the invention operates a communication network that has a packet switched protocol, particularly an Internet Protocol, based cellular telephone network comprising a first layer for transferring signalling information assigned to a telephone call being processed by the communication network, a second layer for transferring payload information assigned to the telephone call and interface means for coupling the cellular telephone network to a further network, the interface means comprising a signalling information exchange function between the cellular telephone network and the further network and a payload information exchange function between the cellular telephone network and the further network, the first layer and the second layer of the cellular telephone network being coupled to the interface means, wherein the payload information of the telephone call is transferred to and from the interface means via a direct route or through-connection assigned to the telephone call and comprised by the second layer.

In a preferred embodiment of the inventive method, after initialising a telephone call or dial up of a call in the cellular network, in a base transceiver station (BTS) of the second layer which is assigned to said call, BTS address information identifying the base transceiver station is generated and forwarded via the first layer of the cellular telephone network to the interface means, and, further, interface address information or media gateway address information is generated in the interface means and forwarded via the first layer to the base transceiver station for establishing a direct through-connection between the base transceiver station and the interface means to allow direct data, call and payload information exchange between the interface means and the base transceiver station and vice versa.

At least one base transceiver station of the second layer, the base transceiver station handling the radio link protocol functions to the mobile stations or mobile telephone units within the assigned cell area, can be provided and further the inventive method can provide a payload protocol function for direct payload information exchange between the base transceiver station and the interface means via the second layer of the cellular telephone network.

In a preferred embodiment of the invention, at least one mobile services switching center (MSC) is provided within the first layer, the method provides a MSC device control protocol for controlling the function of the interface means and for signalling information exchange between the mobile services switching center and the interface means.

The interface means can comprise media gateway means for payload information exchange between the cellular telephone network and the further network and the mobile services switching center can be connected to the media gateway means to exchange signalling information between the media gateway means and the mobile services switching center by the MSC device control protocol function.

In a preferred embodiment of the inventive method, the first layer of the cellular telephone network comprises a base station controller coupled to a number of base transceiver stations and being connected to the mobile services switching center, and the method provides a device control protocol function to be established between the base station controller and each of the base transceiver stations for controlling of the base transceiver stations and the information exchange between the base station controller and the base station transceivers, and, further, the method provides an application signaling protocol function to be established between the base station controller and the mobile services switching center, which, for instance, can be a BSSMAP traditional GSM application protocol.

In a preferred embodiment of the invention, after receiving the media gateway address information from the media gateway, the BTS address information is forwarded from the mobile services switching center via the base station controller to the base transceiver station for establishing a through-connection between the media gateway and the base transceiver station on the basis of the BTS address information and the media gateway address information in order to permit direct exchange of information between the media gateway of the interface means and the base transceiver station of the second layer and vice versa.

BRIEF DESCRIPTION OF THE DRAWINGS

Further objects, advantages, advantageous improvements and applications of the invention are mentioned in the following description of a preferred embodiment of the invention in connection with the enclosed figures, that show.

DETAILED DESCRIPTION OF THE EXEMPLARY PREFERRED EMBODIMENTS

Figure 1:
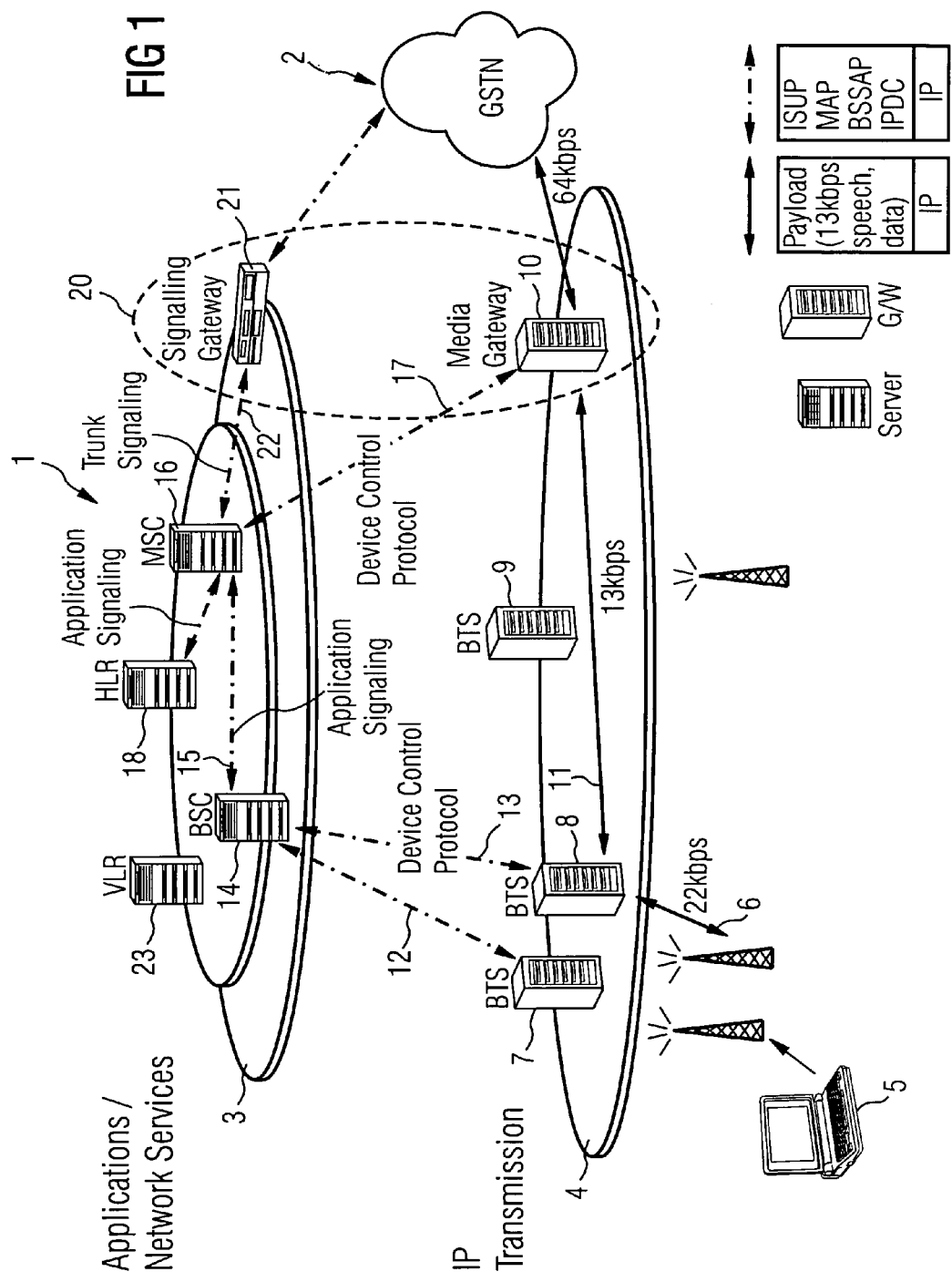
FIG. 1: a schematic block diagram of a communication network according to an embodiment of the invention which has a GSM-network as packet switched network part being coupled to a further network, for instance, a GSTN network.

In the FIG. 1 a schematic block diagram of a preferred embodiment of the communication network of the invention is shown which comprises an IP-based cellular telephone network 1 and a further network 2 that is coupled to the cellular telephone network by means of an interface 20. In the following the invention is described by example using a GSM network as cellular telephone network 1 and a GSTN network as further network.

The cellular telephone network 1 is divided into a first layer 3 or level, also called an application or signalling information processing and transferring platform, comprising application and network service functions and into a second layer 4 or level, also called a transmission or payload information transferring platform, that comprises call information transmission or payload transmission, for instance, in an internet protocol format. Further interface means 20 is provided in order to couple the cellular telephone network 1 to the switched packet network for bi-directional information exchange between these networks or network parts.

The second layer 4 of the GSM network comprises several base transceiver stations (BTS) 7, 8 and 9 as part of a base station subsystem. Each base transceiver station 7, 8, 9 houses the radio transceivers that define a cell being assigned to a cell area and handles the radio link protocol 6 that is the connection to a number of fixed or mobile stations 5 existing in the corresponding cell area.

As shown in FIG. 1 on the second layer 4, the base transceiver station 8 is connected by means of a direct connection 11 or route, also called a through-connection, to a media gateway 10 of the interface means 20. The base transceiver station, therefore, comprises the functionality and protocol for sending and receiving call and payload information from or to the media gateway 10 via the direct protocol connection 11. Further, in order to serve the device control protocol connection 13 between the base transceiver station 8 and the base station controller 14, control protocol software is implemented on both the base transceiver station 8 and the base station controller 14 on the basis of MGCP (Media Gateway Control Protocol) protocols.

The media gateway 10 substantially provides a payload conversion between the packet switched GSM network 1 and the packet switched network, the internet or an internet protocol network or a circuit switched network, or the GSTN as further network 2. The media gateway 10 of the interface means 20 comprises devices such as transcoders, modems, a network access server etc. Since the transcoders are provided within the media gateway 10 of the interface 20, the bandwidth requirements are minimised. Further the media gateway 10 comprises the functionality and control software being required for transferring payload or call information directly to the base transceiver stations 7, 8, 9. On the direct connection 11 from the base transceiver station 8 to the media gateway 10 payload information is transferred with a rate, for instance, of 13 kbps. On the connection from the media gateway 10 to the further network 2 or the internet protocol network the transmission rate corresponds to, for instance, 64 kbps.

The first layer 3 of the GSM cellular telephone network used in the invention comprises a number of base station controllers, wherein in the FIG. 1 one base station controller 14 is shown, a number of mobile services switching centres, wherein one mobile switching center 16 is shown in FIG. 1, a home location register 18 (HLR) and a number of visitor location registers (VLR), wherein only one VLR 23 is shown in the FIG. 1. The home location register 18 contains all the administrative information of each subscriber registered in the GSM network along with the current VLR-location of the mobile stations 5. The visitor location register 23 contains selected administrative information from the home location register 18 necessary for call control and provision of the subscribed services for each fixed station or mobile station 5 currently located in the geographical area controlled by the visitor location register 23. The home location register 18 and the visitor location register 23 together with the mobile services switching center 16 provide the call routing and possibly international roaming capabilities of the GSM network. Further units, for instance, the equipment identity register that contains a list of valid mobile equipment on the GSM network and an authentication centre are not shown in the figures.

The base station controller 14 and the mobile services switching centre 16 are connected via an application signalling protocol connection 15 and the mobile services switching center 16 is also connected to the home location register 18 via an application signalling protocol connection. The application signalling protocol connection 15 is, for instance, implemented on the basis of the known MAP or BSSMAP (Base Station System Management Application Part) protocols.

The mobile services switching centre 16 is the main component of the layer 3 and provides all the functionality needed to handle a mobile subscriber or a mobile station 5, such as registration, authentication, location updating and call routing to a roaming subscriber. Further, in the mobile services switching center 16 a MSC device control protocol is implemented for controlling the media gateway 10 of the interface means 20 via a MSC device control protocol connection 17 between the media gateway 10 and the mobile services switching center 16. For instance, this MSC device control protocol can be implemented in the mobile services switching center 16 on the basis of a media gateway control protocol (MGCP) or device control protocol.

Further on the layer 3 of the GSM network a signalling gateway 21, for instance, a SS7 gateway (Signalling System No. 7), as part of the interface means 20 is shown which, for instance, provides signalling bearer conversions between circuit or packet switched protocols and packet switched protocols or vice versa. It may also provide application level signalling conversions between different protocols. The signalling gateway 21 is connected to the internet or internet protocol network via an interface protocol connection. A number of options for operating and connecting interface means to an internet protocol network or to the further network 2 are described in detail in the internet draft, draft-ietf-megaco-reqs-oo.txt on http://www.ietf.cnri.reston-.va.us/ID.html, having the title "Media Gateway Control Protocol Architecture and Requirements", dated January 1999. Further the signalling gateway 21 of the interface means 20 is connected to the mobile services switching center 16 by means of a trunk signalling protocol connection, for instance, ISUP (ISDN User Part), as shown with the reference sign 22 in FIG. 1.

Figure 2:
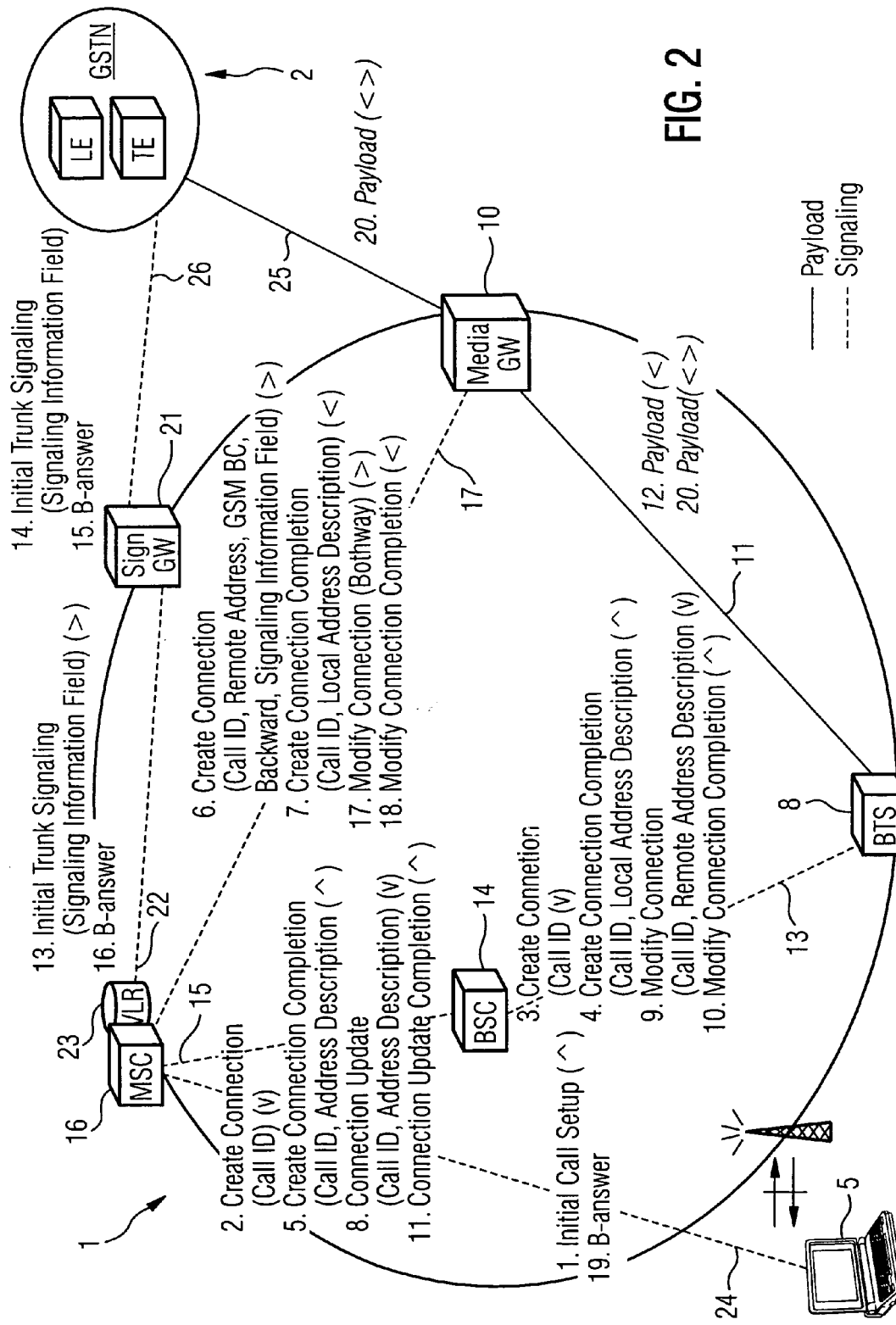
FIG. 2: a signalling flow example for illustrating and explaining establishing of a through-connection within the communication network shown in FIG. 1.

In the following the procedures and steps are explained which are carried out for establishing a through-connection 11 from the base transceiver station 8 to the media gateway 10 of the interface means 20 wherein this through-connection is used as direct connection between the base transceiver station 8 and the media gateway 10 for exchange of call or payload information. The essential steps of the procedure or sequence for establishing this direct through-connection between the base transceiver station 8 and the media gateway 10 are shown by numbers 1. to 20. in the FIG. 2.

In step 1., "Initial Call Setup", a mobile station 5 initiates a new call or dial up access procedure by requesting a call set-up that is forwarded via a protocol connection 24 to the mobile services switching center 16. The protocol connection 24 is supported, for instance, by a DTAP (Direct Transfer Application Part) protocol which is a protocol layer for communication and signalling between the mobile station 5 and the mobile services switching centre 16 in the packet switched protocol based GSM network 1. Actually, the physical connection from the mobile station 5 to the mobile services switching center 16 for exchange of signalling information is realised in upward direction via the radio link 6, also known as the air interface, the base transceiver station 8 as part of the second layer 4 of the GSM network 1, the signalling connection 13, the base station controller 14 as further part of the first layer 3 and the application signalling protocol connection 15 that implements a GSM application protocol. In downward direction from the mobile services switching 16 center to the mobile station 5 the signalling information has to pass the units 15, 14, 13, 8 and 6 (see FIG. 1).

After receiving the call set-up request the mobile services switching centre 16 generates and stores a call identification information that is a unique information assigned to the new call. Then, the mobile services switching centre 16 sends the call identification information back to the base station controller 14 via the application signalling protocol connection 15. This procedures are comprised by the step 2. ("Create Connection") in FIG. 2.

After receiving the call identification information from the mobile services switching centre 16 (step 3. "Create Connection"), the base station controller 14 stores and forwards this call identification information to the base transceiver station 8 via the device control protocol connection 13 in order to create a connection between the mobile services switching centre 16, the base station controller 14 and the base transceiver station 8.

In step 4., "Create Connection Completion", the base transceiver station 8 then stores the call identification information and the base transceiver station 8 reserves the necessary physical and local devices and generates BTS address information or description that is assigned to the base transceiver station 8 and by which the base transceiver station 8 can be reached from media gateways. The base transceiver station 8 then reports and forwards the successful completion to the base station controller 14 via the device control protocol connection 13, wherein the data or information sent back to the base station controller 14 include the BTS address information of the base transceiver station 8.

In step 5., "Create Connection Completion", the base station controller 14 forwards the result including the BTS address information from the base transceiver station 8 to the mobile services switching centre 16 via the application signalling protocol connection 15 in order to create connection completion.

Afterwards, in step 6., "Create Connection" the mobile services switching centre 16 sends a request information for establishing a through-connection to the media gateway 10 of the interface means 20 via the MSC device control protocol connection 17. The request information includes the stored call identification information and the GSM bearer capability for selection and configuration of the necessary devices in the media gateway 10. The request information also includes the BTS address information from the base transceiver station 8 and a through-connection indication in order to request a backward through-connection in the media gateway 10.

After receiving the request information from the mobile services switching centre 16, in step 7., "Create Connection Completion", the media gateway 10 reserves the necessary physical and logical devices and it creates corresponding media gateway address information. Then, the media gateway 10 reports and forwards back the successful completion of the request, and in addition, it sends the media gateway address information or description generated in the media gateway 10 to the mobile services switching center 16 by means of the MSC device control protocol connection 17 between the media gateway 10 and the mobile services switching center 16.

In the next step 8., "Connection Update", the mobile services switching center 16 then forwards the media gateway address information received from the media gateway 10 to the base station controller 14 via the application signalling protocol connection 15 together with the call identification to address the mobile station 5 or call individual or subscriber in the base station controller 14.

Afterwards, in step 9., "Modify Connection", the base station controller 14 forwards the media gateway address information together with the call identification to the base transceiver station 8 via the device control protocol connection 13.

In step 10., "Modify Connection Completion" the base transceiver station 8 then stores the media gateway address information for the corresponding call identification and it reports the successful result back to the base station controller 14 via the device control protocol connection 13 in order to confirm connection completion. Afterwards in step 11., "Connection Update Completion" the base station controller 14 forwards the result or confirmation to the mobile services switching center 16 via the application signalling protocol connection 15. The step 12., "Payload", indicates that a backward through-connection is performed after receiving the media gateway address information in the base transceiver station 8. This means that the media gateway 10 can already forward data, payload or call information received from the further network part 2, for instance, the GSTN or internet, via the MGW/GSTN payload connection 25 directly to the base transceiver station 8 via the direct connection 11 and thus from the base transceiver station 8 via the radio link 6 to the mobile station 5. Such a call information can be for instance a ring control tone.

In step 13., "Initial Trunk Signalling", the mobile services switching center 16 sets up the call to the further network 2 or internet protocol network by means of an initial trunk signalling message that is forwarded over the trunk signalling protocol connection 22 to the signalling gateway 21 of the interface 20, which is coupled to the further network 2 via the SGW/GSTN signalling connection 26. The initial trunk signalling message includes a signalling information field that indicates the node, trunk and timeslot to be used by the signalling gateway 21 and also by the media gateway 10 for connection to the GSTN as further network 2. The trunk signalling protocol connection 22 performs a trunk signalling protocol, for instance, the ISUP.

In step 14., that is called initial trunk signalling, the signalling gateway 21 converts the signalling bearer from the mobile services switching centre 16, for instance, a TCP/IP into MTP bearer or vice versa, and forwards the initial trunk signalling message comprising, for instance, the GSTN signalling information field, via the SGW/GSTN signalling connection 26 to a node in the GSTN which is indicated by the signalling information field and which routes to the address or user called by the mobile station 5.

In step 15., being called the B-answer, the called subscriber homepage or entity of the GSTN has answered and this event is indicated to the signalling gateway 21 from the network side 2 via the SGW/GSTN signalling connection 26. Again in step 16., being called the B-answer step, the signalling gateway 21 converts the signalling bearer from the GSTN network, for instance, from MTP to TCP/IP (Transmission Control Protocol/Internet Protocol) or vice versa and forwards the message from the GSTN network 2 back to the mobile services switching centre 16 via the trunk signalling protocol connection 22.

Afterwards, in step 17., "Modify Connection (Bothway)", the mobile services switching centre 16 requests a both-way through-connection from the media gateway 10 via the MSC device control protocol connection 17 established between the media gateway 10 and the mobile services switching center 16. In the following step 18., "Modify Connection Completion", the media gateway 10 reports and confirms successful completion of the request to the mobile services switching center 16.

Next, in step 19., "B-answer", the mobile services switching center 16 forwards a B-answer message via the protocol connection 24 to the mobile station 5. After receiving the B-answer message the mobile station is informed about the successful establishing or set-up of the telephone connection desired and initiated by the mobile station 5.

Afterwards, in the step 20., "payload", a both-way through-connection between the base transceiver station 8 and the media gateway 10 via the direct connection 11 is established under control of the media gateway 10 and the base transceiver station 8 on the basis of the BTS address information, the media gateway address information and the call identification information, which means, that both the media gateway 10 and the base transceiver station 8 can receive and send data, payload or call information from the media gateway 10 directly to the base transceiver station 8 and vice versa. That means a direct through-connection for bi-directional information exchange is established between the base transceiver station 8 and the media gateway 10. Simultaneously, a payload transferring connection from the media gateway 10 to the GSTN network 2 and vice versa is established. That means a connection for bi-directional information exchange is also established between the media gateway 10 and the GSTN network 2 via the MGW/GSTN payload connection 25. To say it in other words, a both-way through-connection is established between the calling mobile station 5 to a called entity in the further network or GSTN 2 via the radio link 6, the base transceiver station 8, the direct connection 11, the media gateway 10 and the MGW/GSTN payload connection 25.

What is claimed is:

1. Communication network for voice telephone calls, said network having a packet switched protocol based cellular telephone network comprising a first layer for transferring only signalling information assigned to a telephone call being processed by the communication network, a second layer for transferring only payload information assigned to the telephone call and interface means for coupling the cellular telephone network to a further network, the interface means comprising signalling information exchange function between the cellular telephone network and the further network and payload information exchange function between the cellular telephone network and the further network, the first layer and the second layer of the cellular telephone network being coupled to the interface means, wherein the second layer of the cellular telephone network transfers the payload information of the telephone call to and from the interface means on a direct route assigned to the telephone call, wherein the first layer of the cellular telephone network comprises at least one mobile services switching center being coupled to the interface means, and wherein the second layer of the cellular telephone network comprises a number of base transceiver stations, each base transceiver station handling the radio link protocol functions to mobile stations within a cell area assigned to the respective base transceiver station and wherein each base transceiver station is directly connected to the interface means for payload information exchange within the second layer.

2. Communication network of claim 1, wherein the interface means comprises media gateway means for payload information exchange between the cellular telephone network and the further network and to be coupled directly to the base transceiver stations.

3. Communication network of claim 1, wherein the interface means comprises media gateway means for payload information exchange between the cellular telephone network and the further network and wherein the mobile services switching center is connected to a media gateway of the interface means to control the media gateway.

4. Communication network of claim 1, wherein the first layer comprises at least one mobile services switching center being coupled to the interface means for signalling information exchange.

5. Communication network of claim 4, wherein the interface means comprises a signalling gateway for signalling information exchange between the cellular telephone network and the further network and wherein the mobile services switching center is connected to the signalling gateway to exchange signalling information between the signalling gateway and the mobile services switching center.

6. Communication network of claim 1, wherein the first layer of the cellular telephone network comprises at least one mobile services switching center and at least one base station controller being coupled to a number of base transceiver stations of the second layer and being connected to at least one mobile services switching center wherein the base station controller controls each of the base transceiver stations by means of a device control protocol function and communicates to the mobile services switching center by means of an application signalling protocol function.

7. Communication network of claim 1, wherein the cellular telephone network is a GSM network.

8. Communication network of claim 7, wherein the further network is a circuit switched network.

9. Communication network of claim 8, wherein the circuit switched network is a ISDN network, a Public Land Mobile Network PLMN network or a Public Switched Telephone Network PSTN network.

10. Communication network of claim 1, wherein the further network is a packet switched network.

11. Communication network of claim 10, wherein the packet switched network is the Internet, a VoIP network, an Internet Protocol network, a GPRS network or a UMTS network.

12. Method for operating a communication network for voice telephone calls, said network having a packet switched protocol based cellular telephone network, said method comprising the steps of:
    transferring only signalling information assigned to a telephone call being processed by the communication network on a first layer of said cellular telephone network; and
    transferring only payload information assigned to the telephone call on a second layer of said cellular telephone network;
    wherein interface means couples the cellular telephone network to a further network, the interface means comprising a signalling information exchange function between the cellular telephone network and the further network and a payload information exchange function between the cellular telephone network and the further network, the first layer and the second layer of the cellular telephone network being coupled to the interface means, the method further comprising transferring the payload information of the telephone call to and from the interface means via a direct route through the second layer.

13. Method of claim 12, wherein, after initialising the telephone call, in a base transceiver station of the second layer which is assigned to said call, base transceiver station (BTS) address information is generated and forwarded via the first layer of the cellular telephone network to the interface means, and interface address information or media gateway address information is generated in the interface means and forwarded via the first layer of the cellular telephone network to the base transceiver station for establishing a direct the second layer between the base transceiver station and the interface means to allow direct data, payload and call information exchange between the interface means and the base transceiver station and vice versa, wherein at least one mobile services switching center is provided within the first layer of the cellular telephone network, the method providing a mobile services switching center (MSC) device control protocol for signalling information exchange between the mobile services switching center and the interface means, and wherein at least one base transceiver station of the second layer is provided, wherein each said base transceiver station handles the radio link protocol functions to mobile stations within an assigned cell area, the method providing a payload protocol function for direct payload information exchange between each base transceiver station and the interface means via the second layer of the cellular telephone network.

14. Method of claim 13, wherein the interface means comprises a media gateway for payload information exchange between the cellular telephone network and the further network and the mobile services switching center being connected to the media gateway to exchange signalling information between the media gateway and the mobile services switching center by the mobile services switching center (MSC) device control protocol function.

15. Method of claim 12, wherein the first layer of the cellular telephone network comprises at least one mobile services switching center being coupled to the interface means and the method providing a trunk signaling protocol function for signaling information exchange between the mobile services switching center and the interface means.

16. Method of claim 15, wherein the interface means comprises a signalling gateway means for signalling information exchange between the cellular telephone network and the further network and the mobile services switching center being connected to the signalling gateway means, the trunk signalling protocol function is used to exchange signalling information between the signalling gateway means and the mobile services switching center within the first layer.

17. Method of claim 12, wherein the first layer of the cellular telephone network comprises at least one mobile services switching center and a least one base station controller coupled to a number of base transceiver stations of the second layer and being connected to the mobile services switching center, the method providing a device control protocol function to be established between the base station controller and each of the base transceivers for controlling of the base transceiver stations and the information exchange between the base station controller and the base transceiver stations, and the method providing an application signalling protocol function to be established between the base station controller and the mobile services switching center.

18. Method of claim 17, wherein, after initiating a new call by a mobile station, a call identification information being assigned to the new call is generated and stored within the mobile services switching center, then the call identification information is sent by the application signalling protocol function from the mobile services switching center to the base station controller.

19. Method of claim 18, wherein the call identification information from the mobile services switching center is stored within the base station controller and a corresponding request is forwarded to a base transceiver station by means of the device control protocol function being established between the base station controller and the base transceiver station.

20. Method of claim 19, wherein after receiving the call identification information from the base station controller a base transceiver station (BTS) address information is generated in the base transceiver station, the base transceiver station (BTS) address information identifies the base transceiver station being assigned to the call and the call within the base transceiver station in order to allow direct payload information exchange within the second layer of the cellular telephone network between the base transceiver station and the media gateway.

21. Method of claim 20, wherein the generated base transceiver station (BTS) address information is forwarded to the base station controller.

22. Method of claim 19, wherein the call identification information from the base station controller is stored in the base transceiver station.

23. Method of claim 22, wherein after receiving the base transceiver station (BTS) address information from the base transceiver station, the base station controller forwards the base transceiver station (BTS) address information to the mobile services switching center.

24. Method of claim 23, wherein after requesting a connection from the media gateway the call identification and the base transceiver station (BTS) address information are sent to the media gateway utilising the mobile services switching center (MSC) device control protocol function.

25. Method of claim 24, wherein a request for through-connection is sent from the mobile services switching center to the media gateway by means of the mobile services switching center (MSC) device control protocol function.

26. Method of claim 22, wherein media gateway address information which identifies the media gateway is forwarded back to the mobile services switching center by means of the mobile services switching center (MSC) device control protocol.

27. Method of claim 26, wherein after receiving the media gateway address information from the media gateway the media gateway address information is forwarded from the mobile services switching center via the base station controller to the base transceiver station for establishing a through-connection between the media gateway and the base transceiver station on the basis of the BTS information and the media gateway address information in order to permit direct exchange of information between the media gateway and the base transceiver station and vice versa.

28. Communication network for voice telephone calls, said network having a packet switched protocol based cellular telephone network comprising a first layer for transferring only signalling information assigned to a telephone call being processed by the communication network, a second layer for transferring only payload information assigned to the telephone call and interface means for coupling the cellular telephone network to a further network, the interface means comprising signalling information exchange function between the cellular telephone network and the further network and payload information exchange function between the cellular telephone network and the further network, the first layer and the second layer of the cellular telephone network being coupled to the interface means, wherein the second layer of the cellular telephone network transfers the payload information of the telephone call to and from the interface means on a direct route assigned to the telephone call, wherein the first layer of the cellular telephone network comprises at least one mobile services switching center being coupled to the interface means, and wherein the second layer of the cellular telephone network comprises a Base Station Subsystem directly connected to the interface means for payload information exchange within the second layer.

* * * * *

UNITED STATES PATENT AND TRADEMARK OFFICE
CERTIFICATE OF CORRECTION

| | | |
|---|---|---|
| PATENT NO. | : 6,928,067 B1 | Page 1 of 1 |
| APPLICATION NO. | : 09/515766 | |
| DATED | : August 9, 2005 | |
| INVENTOR(S) | : Heino Hameleers et al. | |

It is certified that error appears in the above-identified patent and that said Letters Patent is hereby corrected as shown below:

In Column 11, Line 10, in Claim 13, after "direct" insert -- connection through --, therefor.

Signed and Sealed this

Twentieth Day of November, 2007

JON W. DUDAS
*Director of the United States Patent and Trademark Office*